United States Patent [19]

Wilcox

[11] Patent Number: 4,494,946
[45] Date of Patent: Jan. 22, 1985

[54] FLEXIBLE CONTINUOUS TORQUE TRANSMITTING DEVICE

[75] Inventor: John P. Wilcox, Columbus, Ohio

[73] Assignee: Cummins Engine Company, Inc., Columbus, Ind.

[21] Appl. No.: 296,432

[22] Filed: Aug. 26, 1981

[51] Int. Cl.³ .............................................. F16G 5/26
[52] U.S. Cl. ........................................ 474/242; 474/205
[58] Field of Search ............... 474/205, 240, 242, 244, 474/245

[56] References Cited

U.S. PATENT DOCUMENTS

| | | | |
|---|---|---|---|
| 2,322,466 | 6/1943 | Perry | 474/242 |
| 2,608,875 | 9/1952 | Ellison et al. | 474/242 |
| 3,604,283 | 9/1971 | Van Doorne | 474/275 |
| 3,720,113 | 3/1973 | Van Doorne | 474/242 |
| 3,949,621 | 4/1976 | Beusink et al. | 474/242 |
| 4,056,015 | 11/1977 | Ludoph et al. | 474/28 |
| 4,080,841 | 3/1978 | Vollers | 474/201 |
| 4,152,947 | 5/1979 | van Deursen et al. | 474/28 |
| 4,299,586 | 11/1981 | Van der Hardt Aberson | 474/242 |

Primary Examiner—John E. Murtagh
Assistant Examiner—Andrew Joseph Rudy
Attorney, Agent, or Firm—Neuman, Williams, Anderson & Olson

[57] ABSTRACT

A flexible continuous device is provided for transmitting torque between a driving pulley and a driven pulley. The device comprises a plurality of strut members arranged in aligned side-by-side relation with each member having a predetermined pitch radius relative to the pulley axes. Adjustably engaging a corresponding surface of each strut member is a continuous flexible band member. The engagement between the band member and each strut member surface is at a greater radius than the pitch radius when the strut member is in contact with the periphery of a pulley. A unit is mounted on each strut member and coacts therewith to retain the band member and strut members in assembled relation. Each unit has a portion thereof which protrudes longitudinally of and overlies the exterior of the band member. The protruding portion of each unit extends a predetermined distance beyond the strut member on which it is mounted. The protruding portions of adjacent units are disposed in substantially nested relation.

5 Claims, 8 Drawing Figures

FLEXIBLE CONTINUOUS TORQUE TRANSMITTING DEVICE

BACKGROUND OF THE INVENTION

Various stepless variable speed torque transmitting devices have heretofore been provided; however, because of certain design characteristics they have been beset with one or more of the following shortcomings: (a) the power capacity thereof is unduly limited because of the low tension ratios required; (b) various components of the device are subjected to an inordinate amount of wear; (c) the device produces an undesirable amount of noise during operation; (d) the operating efficiency of a drive or transmission utilizing the device is low;, (e) the device is costly and difficult to install; and (f) the device lacks structural stability.

SUMMARY OF THE INVENTION

Thus, it is an object of the invention to provide an improved torque transmitting device which avoids the aforenoted shortcomings.

It is a further object to provide an improved torque transmitting device wherein compression forces between various components are utilized substantially for the transmission power rather than relying primarily on the tension forces applied to other components of the device.

It is a further object to provide a flexible continuous torque transmitting device which embodies means for effectively controlling flexure of the device during operation thereof.

Further and additional objects will appear from the description, accompanying drawings, and appended claims.

In accordance with one embodiment, a device of the type described is provided which is adapted for use in a continuously variable transmission having a stepless driving pulley and a stepless driven pulley. The device includes a plurality of strut members arranged in an aligned side-by-side relation whereby each member is adapted to engage the pulley peripheries. Each strut member at a given ratio of the driving and driven pulleys has a predetermined pitch radius relative to the axis of each pulley. Corresponding surfaces of the strut members are engaged by a continuous band member which retains the strut members in their desired side-by-side relation. The engagement between the strut and the band members is at a greater radius than the pitch radius of the strut member. Mounted on each strut member is a unit which coacts therewith to capture therebetween a segment of the band member. A portion of each unit extends longitudinally in the direction of movement of the band member and overlies same whereby corresponding portions of adjacent units are disposed in substantially nested relation. The nested unit portions coact with one another and with the band member to retain the plurality of strut member in substantially aligned relation.

DESCRIPTION

For a more complete understanding of the invention, reference should be made to the drawings wherein FIG. 1 is a fragmentary side elevational view showing one form of the device in combination with a driving pulley and a driven pulley.

Figure 1:
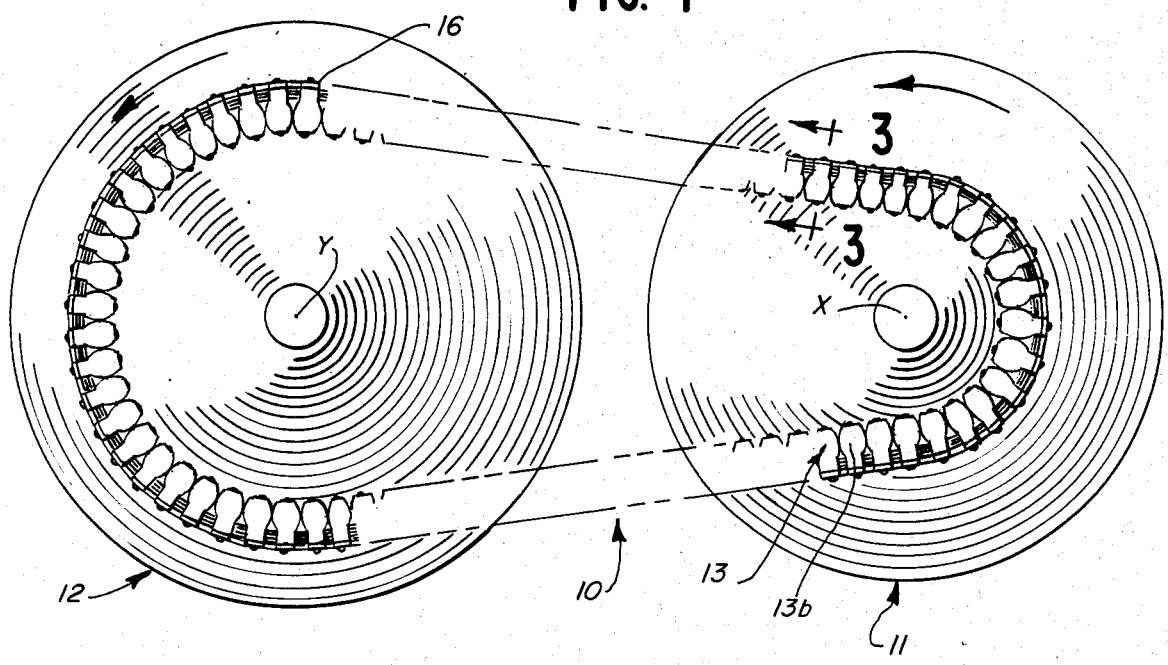

Referring now to the drawings and more particularly to FIG. 1, one embodiment of an improved flexible continuous device 10 is shown which is adapted for use in transmitting torque between a driving pulley 11 and a driven pulley 12. The pulleys may be of a stepless type commonly utilized in a continuously variable transmission. Each pulley includes a pair of pulley sections which are axially adjustable relative to one another to form a peripheral V groove for accommodating the device as the latter moves about peripheral portions of the pulleys. By varying the axial relation between the pulley sections of each pulley, the drive ratio of the transmission can be readily changed to effectively meet the operating demands imposed on the transmission.

Figure 3:
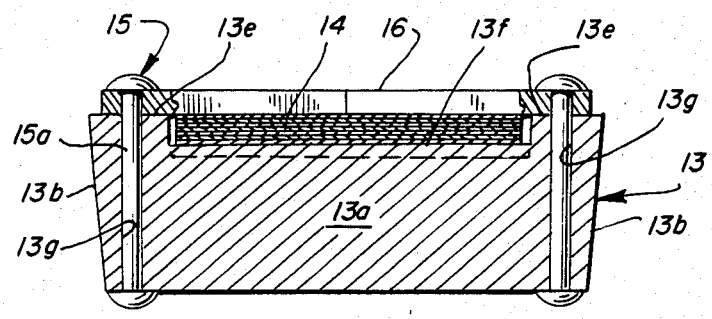
FIG. 3 is an enlarged sectional view taken along line 3—3 of FIG. 1.
Figure 4:
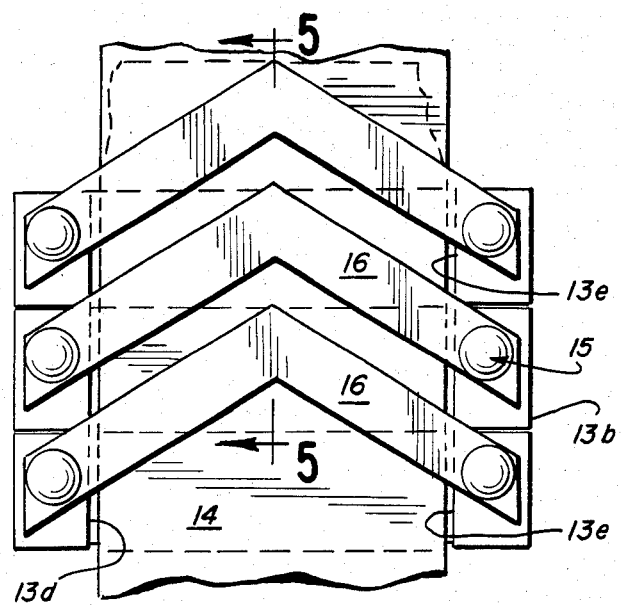
FIG. 4 is a top plan view of the device shown in FIG. 3.
Figure 5:
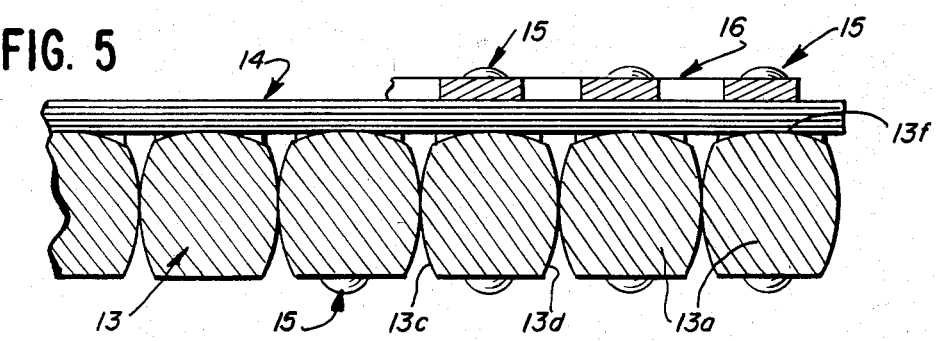
FIG. 5 is a fragmentary sectional view taken along line 5—5 of FIG. 4.

Device 10 as seen in FIGS. 3-5 includes a plurality of strut members 13, each of which is preferably of like configuration and formed of a substantially rigid, wear-resistant material (e.g., a mixture of titanium carbide grains in a heat-treatable steel matrix). The illustrated strut member 13 has an elongated center section 13a with the end faces 13b thereof converging slightly toward the pulley axis X, Y. The convergence of the end faces will conform substantially to the cone angle of the peripheral grooves of the pulleys. The cone angle is commonly defined as the angle between a segment of the pulley face and a radial line. The cone angle in this instance is preferably within the range of about 5.5 to about 6.5 degrees.

The front and rear surfaces 13c, 13d of the strut member are convex, as seen in FIG. 5, so that there will be a rolling contact between adjacent strut members as they move around the peripheries of the pulleys 11, 12. The top surface 13e of the strut member 13 is provided with a central recess 13f in which a flexible continuous band member 14 is disposed, as will be described more fully hereinafter.

The surface of the recess 13f engaged by the band member 14 is slightly convex, as seen more clearly in FIG. 5; thus, reducing wear on the band member and providing a smoother operation of the device. The width of the band member is less than the length of the recess so that the band member does not engage the end walls of the strut member recess 13f during operation of the device.

Figure 2:
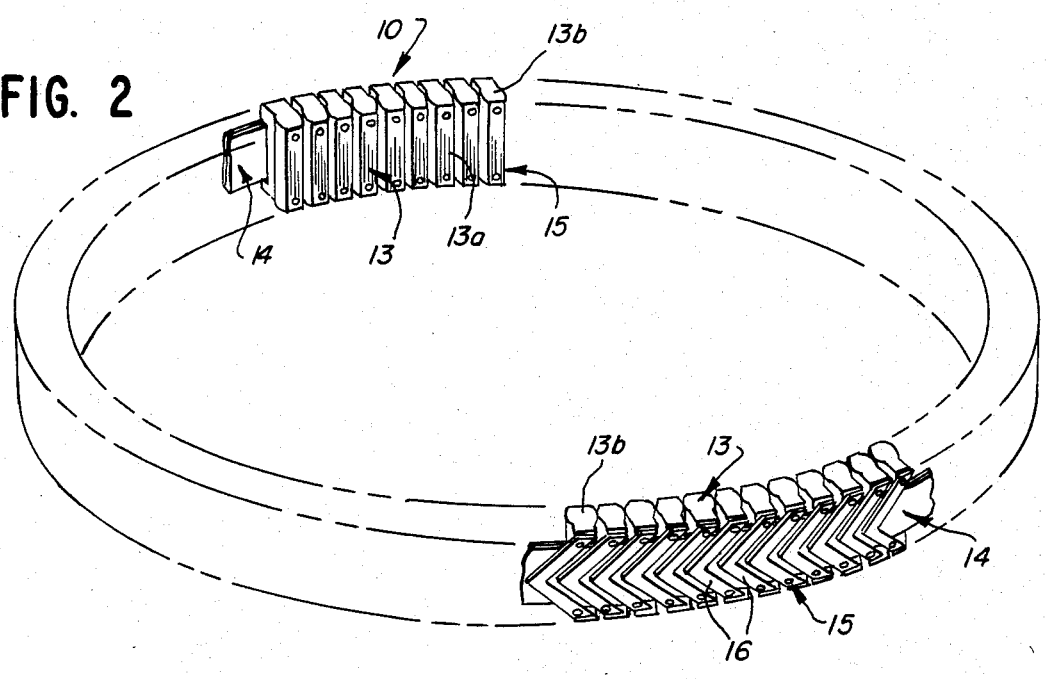
FIG. 2 is a perspective view of the device per se shown in FIG. 1.

Spaced endwise of each recess end wall is a bore 13g which is adapted to receive the shank 15a of a fastener 15, see FIG. 3. Fasteners 15 secure to the upper surface 13e of the strut member 13, a chevron-shaped member 16, see FIG. 4. Member 16 coacts with the recess 13f to capture within the recess a segment of band member 14. The band member 14 and the chevron-shaped member 16 cooperate with one another so as to maintain the plurality of strut members 13 in substantially aligned side-by-side relation as seen in FIGS. 2 and 5. The band member 14 is not fixedly secured to the strut members 13; thus, during certain segments of travel (straight runs) between the pulleys, each strut member may move longitudinally independently of the band member. The importance of this latter feature will become apparent from the discussion hereinafter.

As will be observed in FIG. 4, each chevron-shaped member 16 projects a like amount in a forward direction (i.e., the direction of movement of the band member 14) and overlies a substantial portion of the band member in engagement with the top surface of one or more of the adjacent, preceding strut members 13. Thus, if the device is flexed in one direction beyond its normal straight configuration, the forwardly projecting portions of the members 16 will contact the subtending band member portions and impart rolling (pivoting) moments to the strut members to which they are connected. Such rolling moments start the strut members moving so that a static friction condition is replaced by a dynamic one. It has been determined that the radial force needed to loosen a strut member via the chevron-shaped member 16 is approximately one-eighth the force that would otherwise have to be applied directly to the strut member.

When the forwardly extending portions of the chevron-shaped members 16 exert pressure on the exposed surface portions of the band member when the strut members leave the pulley peripheries, the members 16 overcome the friction of the strut members seeking to cause the latter to continue to adhere to the pulley peripheries and thereby prevent inward deflection of the band member.

In addition to resisting the aforementioned flexure, the chevron-shaped members 16 by reason of their nested relation also resist transverse misalignment of the strut members 13. Such misalignment might occur due to vibration during transporting and installation of the transmission, or during assembly of the strut members on the band member. To provide the aforementioned functions, it is necessary that the members 16 be formed of hardened material (e.g., steel).

The band member 14 is preferably of a laminated construction and comprises a plurality of continuous thin laminae of like configuration secured to one another in superposed relation. Each lamina is preferably of a metallic material (e.g., alloy steel) capable of withstanding substantial tension forces and bending stresses and, yet, is possessed of substantial resistance to galling and wear. As aforementioned, the width of the band member 14 is less than the corresponding dimension of the strut member recess 13f. The number of laminae comprising the band member may vary and will depend upon the type of material used in forming the laminae, and the normal operating conditions to be imposed on the device.

Figure 7:
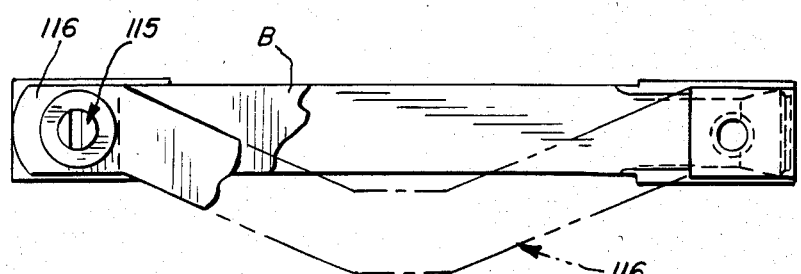
FIG. 7 is a fragmentary top plan view of the device of FIG. 6.
Figure 6:
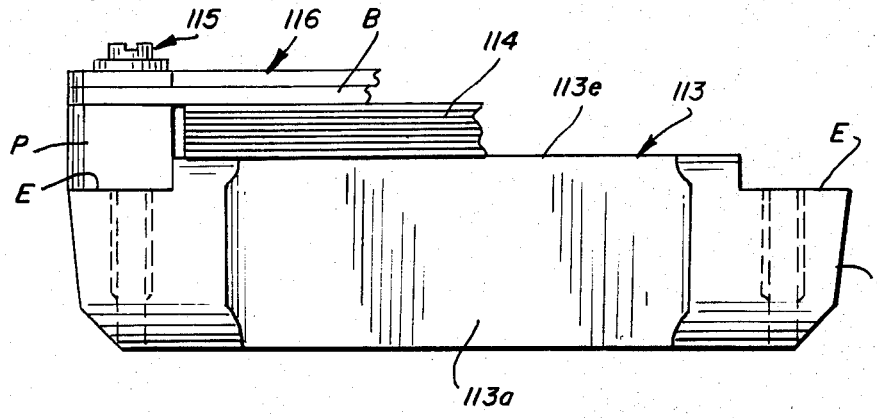
FIG. 6 is an enlarged fragmentary side elevational view of a modified form of device.
Figure 8:
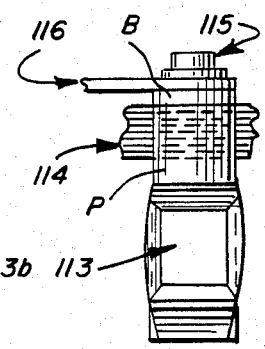
FIG. 8 is a fragmentary end view of the device of FIG. 6.

FIGS. 6–8 illustrate a second form of the improved device 110; the components of the latter device corresponding to those of device 10 will be identified by similar numbers but in a 100 series.

One principal structural difference embodied in device 110 as compared to device 10 resides in the configuration of the individual strut members. In lieu of a centrally disposed recess being formed in the top surface 113e of the strut member 113, the opposite ends E of the top surface are recessed a like amount and each recessed end accommodates a spacer piece P. The length (height) of the spacer piece minus the depth of the end recess is slightly greater than the thickness of the band member 114.

Interposed the upper end of spacer piece P and the ends of the chevron-shaped member 116 is an elongated, substantially rigid bar B. The bar is preferred to be coextensive with the longitudinal dimension of the top surface 113e of the strut member 113. The same material used for the chevron-shaped member 116 may be used in forming the bar.

By reason of bar B, the forwardly projecting portion of member 116 will rest upon the bar B of one or more of the adjacent preceding strut members rather than directly on an exposed surface portion of the band member as in the case of device 10.

The ends of chevron-shaped member 116, bar B, and the associated spacer piece P are secured to the corresponding end of the strut member 113 by a suitable threaded fastener 115 or the like. The width of band member 114 is less than the spacing between the spacer pieces P thereby avoiding serious galling and wear problems which might otherwise exist.

As aforementioned, the strut members 13, 113 are free to slide along the band member 14, 114. By reason of this relationship, the device is of a compression type, sometimes referred to as a compression belt. Thus, with this construction, the strut members 13, 113 may be readily assembled on the band member 14, 114 in such a manner that no holes or notches are required in the band member and the laminae of the band member remain free to move relative to one another. The need for any transfer of tension force from the strut members to the band member is avoided. Besides contacting the peripheral grooves formed in the pulleys, the strut members contact each other and transmit compressive forces from strut member to strut member. Thus, at any point along the length of the device, the net tension would be the tension of the band member 14, 114 minus the compression force between adjacent strut members. It is the net tension which acts to pull the device into the pulley grooves. Since the tension remains substantially constant throughout the length of the band member, any variation in the net tension along the length corresponds to an equal but opposite variation in the compression force. The net tension in this instance is analogous to the tension of a conventional belt, and may be used to define a tension ratio that has a conventional meaning within the art.

In order to obtain proper kinematic action with the improved device, it was necessary to provide some means for closing any gaps which occur between adjacent strut members before the strut members enter the peripheral grooves of the pulleys. Because the strut members, as previously mentioned, are free to move along the band member, such gaps between adjacent strut members normally form in the straight runs of the device. If these gaps are not closed prior to the strut members entering the pulley grooves, slippage between the strut members and the groove surfaces would likely occur and adversely affect operating efficiency.

The gap problem has been overcome in the improved device by locating the band member 14, 114 beyond the pitch radius of the strut members; thus, in the straight runs of device, the band member travels faster than the strut members and tends to drag the strut members forward so as to bring them into contact (compressive force) with each other forming a stack length as shown in FIG. 1 before they enter the pulley grooves.

While the band member 14, 114 is disposed to the outside of the pitch radius of each strut member for a given ratio of the driving and driven pulleys, it is preferred that the distance between the pitch radius and the surface engagement of the band member and strut member be small; thereby, reducing the magnitude of relative movement between the band member and the strut members.

Thus, it will be noted that a torque transmitting device has been provided which is easy to assemble and maintain and is efficient in operation. It is to be understood of course, that the size and configuration of the various components may be varied from that shown without departing from the scope of the invention.

I claim:

1. A flexible, continuous device for transmitting torque between a driving V pulley and a driven V pulley, comprising a plurality of strut means arranged in aligned side-by-side relation, each strut means at a given ratio of the driving and driven pulleys having a predetermined pitch radius relative to the pulley axes; a continuous flexible band means engaging corresponding surfaces of said strut means; and a member mounted on each strut means and coacting therewith to retain said strut means and said band means in assembled relation, each member having a portion thereof protruding longitudinally in the direction of travel of said band means to at least a second strut means beyond the strut means on which it is mounted whereby when the strut means on which the member is mounted begins exiting a pulley in a non-tangential direction, the protruding portion thereof engages a previously exited strut means and the latter exerts an outward force on said forwardly protruding portion causing a pivoting moment on said strut means to which said member is mounted, whereby the latter strut means exits the periphery of the pulley in a generally tangential direction.

2. The device of claim 1 wherein the protruding portions of adjacent members are disposed in substantially nested relation.

3. The device of claim 2 wherein the protruding portion of each member is substantially chevron shaped.

4. The device of claim 3 wherein each member includes an elongated second portion subtending the chevron-shaped portion and spanning the distance between end portions thereof; said second portion coacting with the strut means to capture therebetween a section of said band means while enabling the strut means to move in a longitudinal direction relative to said band means; when a strut means exits a pulley, the chevron-shaped portion thereof engages the second portion of the preceding strut means whereby the segment of the band means disposed intermediate the pulleys maintains a substantially rectilinear configuration.

5. A flexible, continuous device for transmitting torque between a driving V pulley and a driven V pulley, comprising a plurality of strut means arranged in aligned side-by-side relation, each strut means at a given ratio of the driving and driven pulleys having a predetermined pitch radius relative to the pulley axes; a continuous flexible band means engaging corresponding surfaces of said strut means, each strut means being mounted for independent relative longitudinal movement along said band means, a stack length of said strut means relative to a length of said band means causing gaps to form between various adjacent strut means and the latter move between the exit of the driven pulley and the entrance of the driving pulley, the engagement between said band means and each strut means surface being at a greater radius than said pitch radius when said strut means is in contact with the periphery of a pulley whereby the velocity of said band means is greater than the velocity of said strut means while the latter are moving between the pulleys causing any gap between a pair of adjacent strut means to be eliminated and the adjacent strut means to be in side-by-side contact prior to said strut means entering the driving pulley; and a member mounted on each strut means and coacting therewith to retain said strut means and said band means in assembled relation.

* * * * *